UNITED STATES PATENT OFFICE 2,641,549

METHOD FOR PREPARING CONDENSED MILK AND SUCH PRODUCTS CONTAINING LACTOSE

Robbert de Vletter, Leeuwarden, Netherlands, assignor to N. V. Lijempf, Leeuwarden, Netherlands No Drawing. Application March 13, 1950, Serial No. 149,443. In the Netherlands March 16, 1949

3 Claims. (Cl. 99—200)

It is known that condensed milk has the property that the lactose present in it crystallizes out in the form of rather large crystals, which precipitate after a time and can be felt on the tongue as rather sharp particles. In order to keep the mass as homogeneous as possible, the tins or other containers with condensed milk must be turned upside down at times.

It has already been tried to overcome this disadvantage by inoculating condensed milk with lactose crystals.

This known method makes use of the known fact that at a certain supersaturated condition of condensed milk the speed of forming new crystal grains under the influence of crystals, which are already present, shows a maximum. When practising this known method the cooled condensed milk is stirred after the milk has been inoculated with a lactose preparation. However, this gives an insufficient result. On the one side the grown inoculating crystals become too large and inconvenient on the tongue and they can precipitate whereas on the other side it is very difficult to get constant and equal final results. The after-treatment after the inoculation, which is necessary in order to have formed the so-called secondary grains, is cumbrous and can only with extreme difficulty be carried out in such a way that the same results are always obtained in different cases.

The same disadvantages as with sweetened condensed milk can arise with ice-cream, ice mixed paste, thickened chocolate-milk and other products, in which the lactose tends to crystallize out during the preparation or preservation.

The method according to the present invention provides a solution for the problem of regulating the crystallisation in such a way, that the dimensions of the crystals do not exceed a predetermined maximum value without involving an after-treatment which can only be regulated with difficulty and gives inconstant results.

As the maximum value of the length of a lactose crystal which is admissible in a good product, a length of $10/\mu$ is generally assumed in the literature.

When practising the present invention one is however not bound to a definite length; the invention enables this maximum dimension to be regulated to one's own wishes.

It is clear that the quantity of crystals per cubic millimetre in a product with a certain maximum length of the crystal has a certain minimum value in a given composition of this product. So it has been fixed that for condensed sweetened milk this minimum number of crystals per cubic millimetre of product must be about 400,000. One can calculate this number and it can be fixed for each product to one's own wishes. With some method for cooling condensed milk it will be possible that secondary grains are still formed in addition to the inoculating crystals. Because of this the total number of crystals becomes larger and the maximum length of the crystals becomes smaller. As however according to the invention this dimension is only bound to an upper limit (maximum), said circumstance has no influence on the applicability of the invention. When practicing the method according to the invention one is therefore in no way bound to a certain way of cooling and therefore one is able to apply a suitable cooling method independent of the demands to be made upon the crystallisation; this is contrary to the known methods.

According to the invention condensed milk, in which the lactose is present in supersaturated condition, is inoculated with a preparation of the same quantity of very small lactose crystals as the quantity of lactose crystals, which are desired in the final product. Therewith the necessity of an after-treatment is prevented, as the forming of secondary crystal grains is superfluous.

With the help of an example, relating to sweetened condensed milk, there will be explained which maximum dimensions the lactose crystals of the preparation, with which the milk is inoculated, may have.

In order not to influence too much the character of the condensed milk with a fairly well constant lactose percentage of about 12%, not too much lactose may be added. A percentage of about ½% may be used as a maximum.

The specific weight of condensed milk is 1.3, so that 1 cubic millimetre of condensed milk weights 1.3 mg. The predetermined number ($n$) of small lactose crystals must be present in this milk.

According to the invention each cubic millimetre of milk is now inoculated with a quantity of inoculating agent containing $n$ crystals. Assuming that this inoculating agent contains a quantity of fine crystalline lactose to an amount of $p\%$ of the weight of the condensed milk, $$p\% = \frac{p}{100} \times 1.3 \text{ mg.}$$

lactose in the inoculating agent preparation contains also $n$ crystals.

When for convenience's sake a cubic form of the lactose crystals is supposed with a side of length L, in terms of $\mu$, then 1 lactose crystal having a specific weight of 1.53, weighs:

$$1.53 L^3 \times 10^{-9} \text{ mg.}$$

The ultimately desired crystals have therefore a weight of:

$$n \times 1.53 L^3 \times 10^{-9}$$

so that:

$$\frac{p}{100} \times 1.3 = n \times 1.53 L^3 \times 10^{-9}$$

from which follows:

$$L = 204 \sqrt[3]{\frac{p}{h}}$$

If there is supposed that $p$ is 0.5% at most and $n = 400{,}000$, then it follows from this that $L=2.2\mu$. Preferably a smaller quantity of inoculating agent will be used in order to influence the composition of the condensed milk as little as possible. If for example a preparation with crystals of $L=1\mu$ is applied, the same effect can be obtained with only 0.05% lactose.

When practicing the method according to the invention, it has appeared that a condensed milk with really very equal, very small lactose crystals, which do not gravitate is obtained, so that it is not necessary to turn the condensed milk tins. The crystals cannot be felt on the tongue. A special cooling process or other after-treatment is unnecessary, so that the new method is very simple and convenient.

Whereas the method according to the invention is substantially described for application by the preparation of condensed milk, it can also be applied by the preparation of other products containing lactose, such as e. g. ice-cream, ice mixed paste, condensed chocolate milk and other products, in which large crystals may not be present. Also in these cases the demand will be made, that the quantity of lactose used for the inoculation, has also a small or imperceptible influence upon the analysis of the final product. The calcualtion is thereby completely analogous to the above example for condensed milk and it appears also in this case, that the length of the crystals in the inoculating agent preparation must be $2\mu$ at the utmost and preferably smaller.

I claim:

1. The method of treating a sweetened condensed milk solution supersaturated with lactose which normally deposits large insoluble lactose crystals to cause formation of crystals therein of a size less than about $10\mu$ comprising seeding each cubic millimeter of said supersaturated solution with sufficient particles of lactose crystals insoluble therein exceeding about 400,000 in number of a particle size less than $2.2\mu$, said number of seeding crystals being applied prior to crystallization of lactose from said supersaturated lactose solution corresponding to the maximum number that would be formed normally with rapid cooling and agitation and said particel size of said seeding crystals corresponding to the maximum critical size whereby after crystallization about said seeding crystals as a nucleus of lactose by deposition from said supersaturated solution would produce crystals less than about $10\mu$ whereby normally applied continuous agitation and rapid cooling is unnecessary.

2. The method as defined in claim 1, wherein the particle size of the seeding crystals is less than $2\mu$.

3. The method as defined in claim 1, wherein the seeding crystals are smaller than $1\mu$ in size.

ROBBERT DE VLETTER.

References Cited in the file of this patent

Hunziker, O. F., "Cond. Milk and Milk Powder," 6th ed., 1946, pp. 164 to 170, 470 and 471.

Journal of Dairy Science, pages 144, 145, vol. 31, No. 2, February 1948.